April 16, 1946.　　　P. H. GENTZEL　　　2,398,370
SEAT FOR SAFETY VALVE CONSTRUCTIONS
Original Filed July 31, 1939　　2 Sheets-Sheet 1
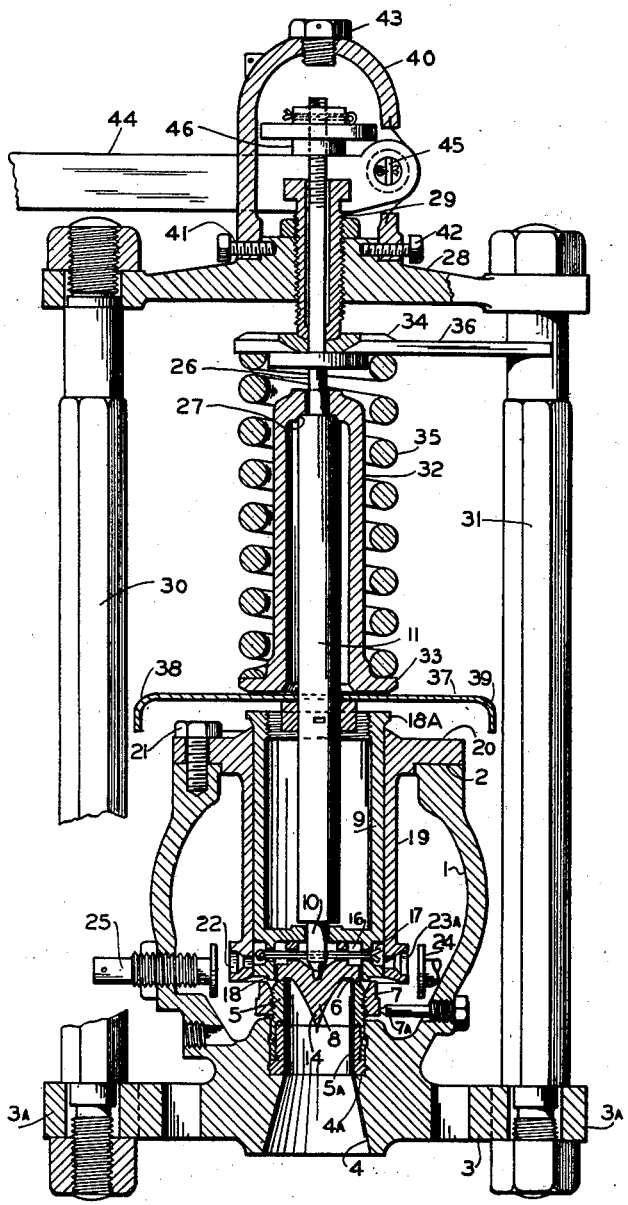
FIG. 1
FIG. 2
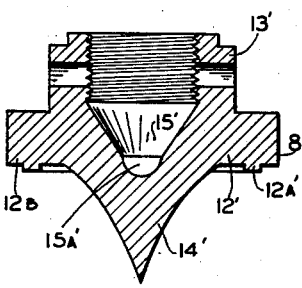
FIG. 3
FIG. 4
FIG. 5
INVENTOR
PERRY H. GENTZEL
BY
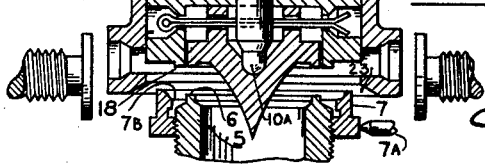
ATTORNEYS April 16, 1946.   P. H. GENTZEL   2,398,370
SEAT FOR SAFETY VALVE CONSTRUCTIONS
Original Filed July 31, 1939   2 Sheets-Sheet 2

INVENTOR
PERRY H. GENTZEL
BY
Caesar and Rivise
ATTORNEYS

Patented Apr. 16, 1946

2,398,370

UNITED STATES PATENT OFFICE 2,398,370

SEAT FOR SAFETY VALVE CONSTRUCTIONS

Perry H. Gentzel, State College, Pa.

Original application July 31, 1939, Serial No. 287,608, now Patent No. 2,278,437, dated April 27, 1942. Divided and this application September 27, 1941, Serial No. 412,621

4 Claims. (Cl. 251—167)

The present invention relates to safety valve constructions, and has particular reference to that type of safety valve generally referred to in the art as a "pop" or "pop safety" valve.

Pop safety valves are widely used upon steam boilers, oil stills, compressed air tanks, superheaters and other tanks containing fluid or gas under pressure in order to relieve excess pressure.

Pop safety valves generally consist of the following essential elements:

1. A throat tube, which may be any relief opening from the tank containing fluid or gas under pressure, and which is provided about its upper periphery with an annular valve seat;

2. A valve disk normally resting upon the valve seat and closing the throat tube;

3. A stem or spindle carrying the valve disk;

4. A spring, which is coiled about the stem or spindle and which urges the valve disk to its seat against the pressure of the fluid or gas in the throat tube; and 5. A valve body encasing the operative parts of the valve.

One difficulty with the conventional prior art valve is the fact that there are four distinct cycles of abuse between the valve seat and the disk. First, the throat tube being subjected to direct contact with the steam expands suddenly and the valve seat drags against the undersurface of the valve disk. Then the valve disk expands and drags over the valve seat. Then when the boiler or steam line is cooled down, the throat tube cools first dragging the valve seat once more against the disk, and finally the disk follows and drags over the valve seat. These four cycles occur in a conventional safety valve, even though the valve never pops, thus causing leakage between the disk and its seat.

A primary object of the invention is to provide a distinctively new valve construction particularly adapted for service as a safety valve for pressures as high as 3000 pounds per square inch and temperatures as high as 1000° F.

Another object of importance is to provide a safety valve in which the tearing action between the valve seat and the valve disk is reduced to a minimum or eliminated entirely.

A further object is to provide a safety valve in which leakage between the seat ring and the body wall resulting from variable expansion and contraction is practically eliminated.

Still another object is to provide a safety valve which, while capable of accomplishing the foregoing objects, is nevertheless of relatively simple and inexpensive construction and can be assembled and dismantled very readily.

Other objects and advantages will appear as the description of the invention proceeds.

Referring briefly to the drawings:

Figure 1 is a vertical section, partly in elevation and partly broken away, of an illustrative embodiment of the safety valve of the invention;

Figure 2 is a fragmentary section of the valve disk and adjacent parts of the valve shown in Figure 1, the elements being shown in the relative positions they occupy when the valve is in substantially full open position and ready to cut off and close;

Figure 3 is a vertical section through the valve disk itself;

Figure 4 is a fragmentary cross-section similar to Figure 2 of a somewhat modified form of safety valve;

Figure 5 is a vertical section through the valve disk of Figure 4;

Figure 7:
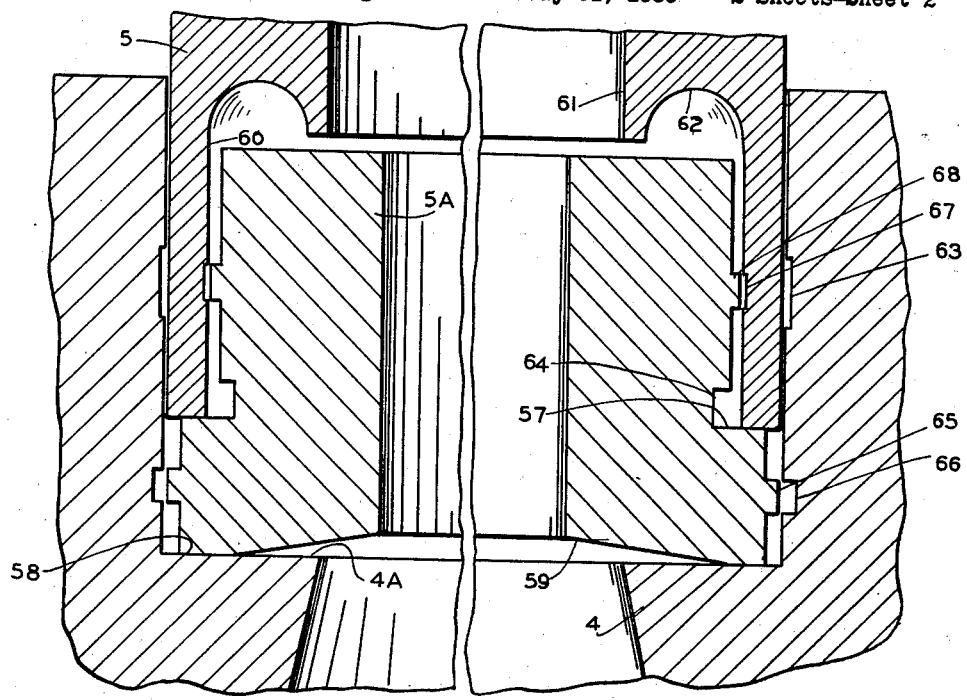
Figure 7 is an enlarged fragmentary cross-section similar to Figure 6, showing the throat tube and associated elements prior to the rolling-in operation.

Referring in greater detail to the embodiment of the invention illustrated in Figures 1 to 3 inclusive, the numeral 1 denotes the valve body or bowl of the valve. This element, which is shown as being in the form of a pear-shaped hollow casting or forging, may advantageously be of steel, though other metals or alloys may be used. The top of the body is open and is provided with a flat annular seat 2, which serves a purpose to be hereinafter pointed out.

The body is provided at its lower end with the horizontal flange 3 and the lugs 3a. The reference numeral 4 denotes a relief opening for connection with a steam boiler or a tank adapted to contain fluid under pressure. The relief opening 4 tapers upwardly into the body of the valve, and has a stepped upper portion providing an annular recess 4a. Within this annular recess are secured the throat tube nozzle 5 and the nozzle expansion ring 5a in a manner to be later described.

The throat tube is preferably stream-lined at its upper end, and is provided with an annular valve seat 6. It may advantageously be provided with a nozzle ring 7 mounted concentrically with the valve seat. The ring 7 is preferably mounted adjustably on the upper end of the throat tube as by means of cooperating screw threads on both the tube and the ring. The locking screw 7a may be provided to maintain the ring in adjusted position. The shape of the ring does not constitute an essential feature of the invention, but it should preferably be such as to secure a minimum "blow-down" and to eliminate what is technically known as "warn" or "simmer" at popping.

It is to be particularly noted that between the valve seat 6 and the upper periphery of the nozzle ring 7 there is formed a V-shaped annular groove 7b. This groove, which is normally covered by the valve disk and disk carrier, constitutes in effect a pilot valve, the least amount of steam leaking into this space from the throat tube being sufficient to cause the valve to pop without any accumulation of pressure. As will hereinafter be pointed out, the valve disk or the disk carrier may be provided with a portion overhanging the groove 7b. The overhanging portion appears to have the effect of increasing the sensitivity of the valve, and results in an instantaneous full lift of the valve disk, particularly in small valves up to 1½".

The valve disk (see Figure 3) is designated generally by the numeral 8. It is detachably connected to the disk carrier or piston 9 and to the lower reduced end 10 of the spindle 11 in a manner to be described. It is to be particularly noted that the piston 9 preferably projects through the valve body to the atmosphere. In this way, I have found it possible to obviate the accumulation of steam above the valve disk which usually occurs in conventional constructions. The valve disk consists of a disk-like body portion 12, which is wide enough to cover the valve seat 6 and to close the passage through the bowl. The underside of the body portion 12 is preferably provided with an annular rim 12a, which may advantageously be the same width as the valve seat 6. This rim serves to prevent the formation of fins on the valve seat. The formation of fins is a principal cause of leakage.

In the valve disk of Figures 1, 2 and 3 the annular rim 12a is shown as being disposed at the outer edge of the underside of the valve disk. As will later be pointed out, the annular rim may be spaced a short distance from the outer edge, thereby leaving an annular groove at the outer edge.

The valve disk 8 is proferably provided with a lower conical portion 14, which cooperates with the upper end of the throat tube 5 to minimize the resistance to the flow of steam from the throat tube. By stream lining the portions of the valve with which the steam comes into direct contact, I have found it possible to obtain a nozzle efficiency of 94% to 97%. This high efficiency renders it possible to obtain full opening of the valve instantaneously, and without any appreciable accumulation of pressure (overpressure). This is particularly so in valve constructions wherein either the valve disk or the disk carrier 9 or both are provided on their undersides with the annular overhanging portion previously referred to.

The valve disk is further provided with a central recess 15, which extends well into the body portion. The lower end 15a of the recess is hemispherical in shape and extends well below the valve seat level 12a. The body of the valve disk is symmetrical in design and preferably has the same wall thickness as the throat tube. The valve disk has a minimum amount of metallic contact with the disk carrier 9 and the spindle 11. It is to be particularly noted that the reduced end 10 of the spindle has a narrow rounded point 10a which is received in the hemispherical recess 15a in the valve disk 8. The foregoing structure is such that the heat transfer between the various elements is kept at a minimum and the radial expansion of the valve disk is substantially the same as that of the valve seat 6. As a result, the tearing action between the valve disk and the seat so characteristic of prior art valves is practically eliminated. Furthermore, there is no tendency for the valve disk to either tilt on its seat or to become distorted. Hence, the valve disk must either pop or lie substantially flat on its seat.

The disk carrier or piston 9 is in the form of a cylindrical cup having the cylindrical recess 16 in its bottom. The valve disk 8 is received within the recess 16 with its conical lower portion 14 extending down into the throat tube nozzle 5. The depth of the recess is preferably such that the body 8 projects slightly below the bottom of the disk carrier. The restricted lower end 10 of the spindle 11 extends through an aperture in the bottom of the carrier 9 into the recess 15 in the valve disk. A cotter pin 17, which may well be of stainless steel, extends through alined apertures in the disk carrier 9, the restricted upper portion 13 of the valve disk and the restricted lower end of the spindle 11 to detachably secure the valve disk to the disk carrier and to the spindle. The rounded pointed lower end 10a of the spindle fits snugly in the hemispherical bottom 15a of the recess 15 of the valve disk.

The disk carrier or piston 9 is shown as being provided about the recess 16 with an annular ridge 18 which overhangs the annular groove 7b between the throat tube 5 and the nozzle ring 7.

The disk carrier or piston 9 is mounted for slidable movement in the guide 19. The guide is substantially cylindrical in form and is provided at its upper end with an annuular flange 20, which is adapted to seat on the annular seat 2 on the bowl 1. The flange 20 may be secured to the seat in any suitable manner, as by means of the threaded bolt 21. In case the valve seat has to be remachined, the guide member may be lowered the necessary amount to cause a reseating of the valve disk by machining the annular seat 2 the required amount.

The upper peripheral margin of the disk carrier 9 is shown as being flared at 18a at about an angle of 45°. This serves to deflect the steam escaping between the piston 9 and guide 19 away from the spring to be hereinafter described, thereby protecting the spring from direct contact with the escaping steam. As will hereinafter be pointed out, a deflector plate may be mounted on the spindle between the disk carrier and the spring to protect the spring as well as the frame rods to be hereinafter described, in which case it will be unnecessary to provide the upper peripheral margin of the disk carrier with the flare 18a.

The numeral 22 designates an annular recess formed in the inner surface of the cylindrical guide 19 near its lower end. This recess will hereinafter be referred to as the "exhaust belt" or "exhaust chamber" for a reason which will appear as the description proceeds. The upper and lower walls of the exhaust belt are preferably disposed at right angles to the vertical circumferential wall. The underside of the lower wall may advantageously be bevelled at an obtuse angle, as indicated by the reference numeral 23.

The outer circumferential wall of the exhaust belt is provided with one or more apertures 23a, which may advantageously be disposed radially at equal distances about the exhaust belt. These apertures will hereinafter be referred to as "exhaust ports." Opposite one or more of the exhaust ports is a valve disk 24 disposed at right angles to the corresponding port and carried at the inner end of a threaded rod 25, which extends through the wall of the bowl. In a preferred embodiment, there are four exhaust ports equally spaced about the exhaust belt, two of the exhaust ports being provided with valve disks 24 and the other two exhaust ports being uncontrolled. The valve disks 24 will be hereinafter referred to as "metering valves."

At this point, it is to be noted that the exhaust belt is above the valve seat and that it is normally closed about its inner periphery by the lower periphery of the piston 9. As soon as the valve disk recedes from its seat, the exhaust belt opens into communication with the throat tube, and permits a sufficient amount of steam under pressure to escape from under the valve disk, thus preventing a building up of presure under the disk. The area of the exhaust belt is large enough to compensate for the jet action and reactive force, but it is not as large as the area of the throat tube. The exhaust belt provides means for eliminating the undesirable effects of jet action and reactive force, thereby rendering it possible to achieve instantaneous full opening without sacrificing minimum blow-down.

It is also to be noted that the metering valves constitute means to regulate or control the amount of steam escaping through the exhaust belt. The metering valves provide for fairly acculate control or regulation of any reaction pressure to which the valve disk may be subjected, and permits a fairly wide range of blow-down. To increase the blow-down, it is merely necessary to screw the threaded rod 25 in toward the exhaust ports, while to decrease the blow-down, the rods are screwed outwardly. I have found it possible to vary the blow-down from above 8% to as low as ½ of 1%.

It is further to be noted that the adjustment of the metering valves is unaffected by the rise and fall of the exhaust belt due to body extension, as the exhaust belt is always within the active field of operation of the nozzle ring 7. Furthermore, no rearrangement or changing of the parts is necessary when the guide 19 is lowered to reseat it after the valve seat is remachined as has already been described.

Referring now to the spindle 11, it will be noted that in addition to its reduced lower end 10 it has an upper reduced end 26, which forms a shoulder 27 with the central body portion of the spindle. The end 26 extends through a yoke or cross-bar 28, and is threaded as shown for a purpose to be hereinafter pointed out. The numeral 29 designates a pressure or adjusting screw, which serves as a bushing or guide for the upper end of the spindle in addition to its function of adjusting the pressure on the spring. The cross-bar 28 is supported above the valve by means of the two frame rods 30 and 31, which may be threadedly engaged at their lower ends with the lugs 3a. These frame rods serve to overcome in large measure the effect of crawl or body elongation by maintaining the pressure of the spring practically constant.

The numeral 32 designates a sleeve, which is mounted on and suspended from the shoulder 27. For most of its length the inner diameter of the sleeve is greater than that of the spindle 11. The sleeve is provided at its lower end with a flange 33, which is spaced a small distance above the top of the disk carrier or piston 9. The numeral 34 indicates a collar or spring washer to which is connected in any suitable manner the coil spring 35, the other end of which spring is supported upon the flange 33 of the sleeve. The spring is shown as being exposed, but it may be enclosed, particularly if the valve is to be used in still work. Pressure is adapted to be applied to the spring through the collar or spring washer 34 by means of the pressure screw 29, which bears directly against the collar or spring washer. The guide rod 36 serves to prevent rotation of the spring washer 34 and the spindle 11 with rotation of the screw 29. Rotation between the spring and the spindle generally occurs in conventional valves when the pressure screw 29 is rotated to set the valve to the required popping pressure and also at the moment the valve pops. Rotation between these elements tends to destroy the lapped seating surfaces and is therefore definitely undesirable.

It is to be noted that the top of the sleeve 32 is the lower limit of movement of the spring washer or collar 34; also that the distance between the lower surface of the washer or collar 34 and the upper margin of the sleeve 32 is equal to the lift that will give full capacity of the nozzle or orifice of the valve. Hence, it is impossible to strain the spring by an overload, for when the spring reaches its capacity or required compression for full lift the washer or collar 34 and the sleeve 32 contact. It is also to be noted that the mounting of the spring also eliminates side thrust and friction between the parts, and that there is a minimum of metallic contact between the spring mounting and the rest of the valve. As will hereinafter be pointed out in greater detail, the spring is protected from direct contact with the steam and from great and sudden temperature changes by means of the deflector plate 37 now to be described.

The deflector plate 37 is secured in a suitable manner to the sprindle 11 between the valve body 1 of the valve and the sleeve 32. The deflector plate may be rectangular in form and may be provided with the downwardly extending flanges 38 and 39 at the two edges adjacent the frame rods 30 and 31. The deflector plate serves to deflect any steam or vapor that might otherwise reach the frame rods 30 and 31 and the spring 35, thereby protecting said elements from great and sudden temperature changes. Heat cannot reach the frame rods and spring directly. For instance, heat to reach the spring 35 has to pass up the spindle 11 to the point of suspension of the sleeve 32 and then down again to the flange 33 of the sleeve. In this connection, it may be stated that the quantity of heat transmission to the frame rods and the spring can be further decreased by insulating the frame rods from the valve body and insulating the deflector plate from the spindle 11. A suitable manner of insulating the frame rods consists in encasing them in insulation material, it being preferable to maintain complete circulation around the frame rods. It is generally not necessary to extend the insulation material above the deflector plate.

The numeral 40 designates a cap or bonnet of suitable form or construction, which may be secured by means of set screws 41 and 42 to the yoke or cross-bar 28. The bonnet may be provided at its top with a threaded aperture adapted to interchangeably receive a plug 43 or a gag screw.

The numeral 44 refers to a lever which is fulcrumed at 45 in the bonnet. The lever engages the lower surface of a nut 46, which is threadedly connected to the upper reduced end 26 of the spindle 11, and extends through an aperture provided in the side of the bonnet. The lever provides a means for raising the valve disk from its seat by hand or by means of a cable (not shown).

The embodiment of the invention illustrated in Figures 4 and 5 differs from that shown in Figures 1, 2 and 3 in an important particular. In Figure 5, the parts are designated by the same numerals as in Figures 2 and 3, a prime being added. It will be noted that the annular rim 12a' on the underside of the valve disk 8' is spaced a short distance from the outer edge of the valve body. The valve disk is somewhat wider than the valve seat 6', so that the annular recessed edge portion 12b beyond the annular ridge 12a' overhangs the annular groove 7b'.

At this point, it is to be noted that the nozzle ring 7 in Figures 1 and 2 or the nozzle ring 7' in Figure 4 may be adjusted so that its upper rim portion is below or above the valve seat a desired amount or flush with the valve seat.

Figure 6:
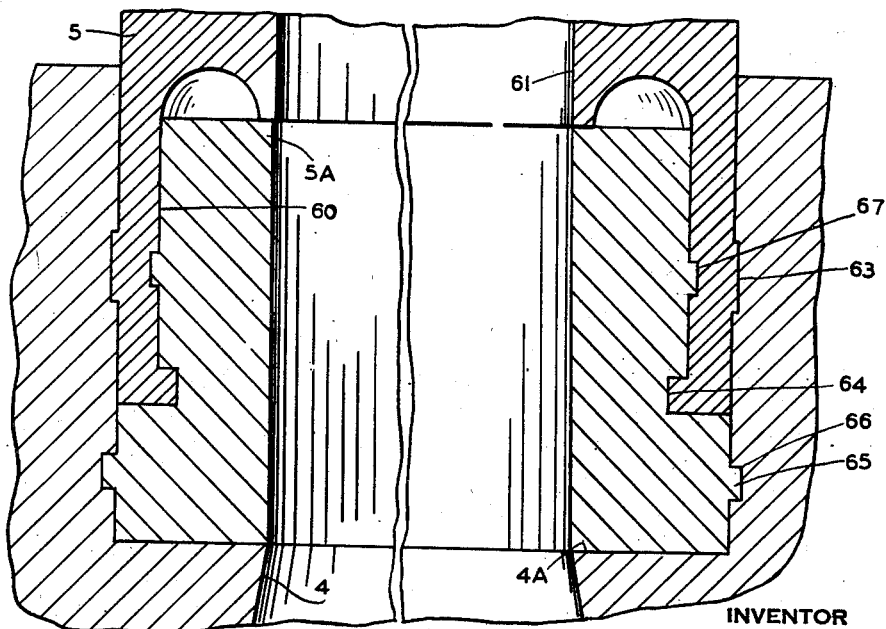
Figure 6 is an enlarged fragmentary vertical cross-section through the throat tube of the valve of Figure 1, showing the manner in which the throat tube is assembled and secured to the body of the valve.

Reference will now be had to Figure 6, which is an enlarged fragmentary vertical cross-section through the throat tube of Figure 1, showing the manner in which the throat tube is assembled and permanently secured to the body of the valve. As previously stated, the numeral 4 denotes the relief opening of the valve, 4a is a communicating annular recess, and 5 and 5a are the throat tube nozzle and nozzle expansion ring which are secured within the recess.

Reference will now be had to Figure 7, which is an enlarged fragmentary vertical cross-section through the upper end of the relief opening 4, the throat tube nozzle 5 and the nozzle expansion ring 5a, showing the manner in which these elements are assembled prior to the operation of expanding and rolling the throat tube nozzle and the expansion ring into the recess 4a at the upper end of the relief opening.

As shown in Figure 7, the expansion ring 5a is wider at the bottom than at the top, thus providing an annular step 57. The bottom of the ring may advantageously be provided with a substantially horizontal outer margin 58 and with an inner margin 59 that slopes upwardly as shown. The outer diameters of both the top and bottom portions of the ring 5a are somewhat smaller than the diameter of the recess 4a, and the inner diameter of the ring is somewhat smaller than the diameter of the restricted upper portion of the relief opening 4. In assembling the expansion ring 5a with the recess 4a, it is merely necessary to drop the expansion ring into the recess so that the horizontal outer margin 58 of the ring rests on the floor of the recess.

The throat tube nozzle 5 is provided with an outer annular vertical flange 60 and an inner vertical flange 61, the two flanges being connected by means of a curved annular recess 62. The outer diameter of the throat tube nozzle 5 is somewhat smaller than the recess 4a, but it is somewhat larger than the diameters of both portions of the expansion ring 5a. The inner diameter of the flange 60 is somewhat smaller than the diameter of the lower portion of the expansion ring, but it is somewhat larger than the diameter of the upper portion of the expansion ring. The inner diameter of the throat tube nozzle (i. e. the inner diameter of the inner flange 61) is somewhat larger than the inner diameter of the expansion ring. The inner flange 61 of the throat tube nozzle is substantially shorter than the outer flange 60, so that when the throat tube nozzle is placed in position (see Figure 7), the outer flange rests on the step 57 of the expansion ring and the flange 61 does not quite reach the upper surface of the expansion ring. The expansion ring is preferably of the same material as the body of the valve or of a material having substantially the same coefficient of expansion. As examples of suitable materials may be mentioned stainless steels such as a 4 to 6 chrome steel or a molybdenum steel. The throat tube nozzle may also be of the same material as the valve body, but it is preferably of a material having a slightly greater coefficient of expansion. The differential expansion should be within the elastic limit of both the throat tube nozzle and the expansion ring. The thicknesses of the throat tube nozzle and the expansion ring are such that they can readily be expanded and rolled in the manner to be described.

To secure the throat tube nozzle to the body of the valve, the throat tube nozzle 5 and the expansion ring 5a are assembled in reference to the relief opening as shown in Figure 7, and are held by means of a suitable form of clamp to keep them in alinement and to prevent rotation. The throat tube nozzle and the expansion ring are then rolled into the recess 4a by means of a suitable form of expander in a manner similar to that employed in standard boiler tube practice. During this operation, the outer periphery of the throat tube nozzle and the outer periphery of the lower portion of the expansion ring are forced against the vertical wall of the recess 4a and the outer periphery of the upper portion of the expansion ring is forced against the inner periphery of the flange 60, so that the flange 60 is securely and permanently clamped between the upper portion of the expansion ring and the vertical wall of the recess 4a. The inner peripheries of both the throat tube nozzle and the expansion ring become flush with the upper end of the relief opening 4, the bottom 58, 59 of the expansion ring becomes flush with the floor of the recess 4a, and the inner flange 61 of the throat tube nozzle is flattened against the top of the expansion ring. The described rolling operation is preferably carried out before the other parts of the valve such as the guide, piston, valve disk, etc. are assembled. The construction and manner of assembly just described afford a very inexpensive and effective way to insure tightness between the throat tube and the valve body and to eliminate leakage between the seat ring and body wall due to variable expansion and contraction. The above described construction also serves to greatly reduce the differential expansion between the valve body and throat tube, thereby avoiding undue stresses at the base of the valve and greatly reducing the compressive strain on the tube.

Before leaving the throat tube construction, it may be stated that the effectiveness of the clamping action of the expansion ring may be substantially increased by providing the vertical wall of the recess 4a and the outer periphery of the upper portion of the expansion ring with one or more horizontal annular grooves. In Figure 7, it will be noted that I have provided the vertical wall of the recess 4a with an annular groove 63 and the outer periphery of the upper portion of the expansion ring 5a with an annular groove 64. The annular groove 64 is somewhat lower in position than the groove 63, and it will be understood that during the expanding and rolling in operation a portion of the smooth outer surface of the flange 60 is forced into the groove 63 and a portion of the smooth inner surface of the flange 60 is forced into the groove 64.

Cooperating annular ribs and grooves may also be provided between the lower portion of the expansion ring 5a and the recess 4a and between the upper portion of the expansion ring and the flange 60 of the throat tube nozzle. In Figure 7, it will be noted that I have provided the lower portion of the expansion ring with a horizontal annular rib 65 and that I have provided the vertical wall of the recess 4a with a cooperating annular groove 66. Also that I have provided the inner surface of the flange 60 and the upper portion of the expansion ring 5a with cooperating annular groove 67 and rib 68. Each cooperating annular groove and rib are preferably of the same vertical dimension (width), but the ribs are preferably of a greater horizontal dimension than the cooperating grooves. It will be understood that during the expanding and rolling in operation, the ribs 65 and 68 will be forced into the corresponding grooves 66 and 67 and that because of the relative dimensions of the ribs and grooves, the ribs will be caused to flatten out or become "bull-nosed," thereby forming a tight and permanent seal.

The valve of the invention may be installed in any position, but it should preferably be installed either vertically above the steam line or with the spring and frame rods hanging vertically below the line. If the valve is to be installed vertically downwards, it is preferable to provide a housing for the spring. As previously stated, the frame rods may also be encased in insulation material, provided that complete circulation around the frame rods is maintained.

It is thought that the mode of operation of the valve will be understood from the foregoing description. Suffice it to say, that as the pressure of the steam in the throat tube reaches the popping pressure, the valve disk rises instantaneously to its full lift in a single stage. As has been previously stated, the least amount of steam at popping pressure leaking from the throat tube into the annular groove between the valve seat and the nozzle ring (space 7b in Figure 2) is sufficient to cause the valve to pop. As the valve disk recedes from its seat, steam is compressed into the exhaust belt from which it escapes through the exhaust ports to an extent depending upon the adjustment of the closure disks of the metering valves, thus removing the excess pressure from beneath the valve disk and eliminating all impediment to the closing of the valve when the necessary relief is obtained. As the valve disk returns to its seat the steam in the annular groove between the valve seat and the nozzle ring is compressed, forming a cushion so that the valve disk seats without shock or injury to the meeting surfaces. As previously noted, the metering valves may be readily adjusted to give a predetermined blow-down for a given set of conditions.

In conclusion, it may be stated that various modifications of the invention may be made, and that it is therefore to be understood that the invention is not be considered as being limited by the specific examples herein given as illustrative of the invention, except as may be necessitated by the state of the prior art.

It is also to be understood that such terms as "top," "bottom," "upper," "lower," "underside," etc. are relative and not absolute, and have reference to the parts of the valve when the valve is installed with the frame rods extending vertically upwardly, and that when the valve is installed in a position other than with the frame rods extending vertically upwardly, these terms are to be construed accordingly.

This application is a division of application Serial No. 287,608, filed July 31, 1939, which issued on April 27, 1942, as Patent No. 2,278,437.

I claim:

1. As a subcombination of a valve, said valve comprising a valve body provided with a relief opening for connection with a tank adapted to contain fluid under pressure, said relief opening being provided about its upper portion with an annular recess, an expansion ring mounted in said recess, said expansion ring having a wide lower portion fitting snugly in said recess and a narrow upper portion providing an annular space between the vertical wall of the recess and the upper portion of the expansion ring, and a throat tube nozzle having an annular flange at its lower end, and being snugly secured in said recess by means of the clamping action of the expansion ring against said flange.

2. The construction defined in claim 1, the vertical wall of the recess and the narrow portion of the expansion ring being provided with annular grooves, portions of the flange of the throat tube fitting snugly in said grooves.

3. The construction defined in claim 1, the vertical wall of the recess and the inner periphery of the flange of the throat tube nozzle each being provided with an annular groove, and the expansion ring being provided with annular ribs, said ribs fitting snugly in said grooves.

4. As a subcombination of a valve, said valve comprising a valve body provided with a relief opening for connection with a tank adapted to contain fluid under pressure, said relief opening being provided about its upper periphery with an annular recess, an expansion ring mounted in said recess, said expansion ring having a wide lower portion fitting snugly in said recess and a narrow upper portion providing an annular space between the vertical wall of the recess and the upper portion of the expansion ring, and a throat tube nozzle having an annular flange at its lower end, and being snugly secured in said recess by means of the clamping action of the expansion ring against said flange, the inner surfaces of the throat tube and of the expansion ring being substantially flush and forming a continuous surface.

PERRY H. GENTZEL.